United States Patent

[11] 3,601,475

| [72] | Inventor | Harvey L. Ratliff, Jr.<br>Waldorf, Md. |
|---|---|---|
| [21] | Appl. No. | 860,489 |
| [22] | Filed | Sept. 24, 1969 |
| [45] | Patented | Aug. 24, 1971 |
| [73] | Assignee | Jetru Inc.<br>Amarillo, Tex.<br>This application is a continuation-in-part of Ser. No. 440,110, Mar. 16, 1965, now Pat. No. 3,504,122 and Ser. No. 618,977, filed Feb. 27, 1967, now Pat. No. 3,471,224, which is a continuation-in-part of Ser. No. 343,841, Feb. 10, 1964, now Pat. No. 3,464,570, and Ser. No. 638,319, filed May 15, 1967, and Ser. No. 662,716, filed Aug. 23, 1967, now abandoned. |

[54] DISTORTION-FREE PANORAMIC VIEWER AND PICTURE THEREFOR
4 Claims, 7 Drawing Figs.

[52] U.S. Cl. .................................................. 350/239, 350/175 E
[51] Int. Cl. ................................................... G02b 27/02
[50] Field of Search .......................................... 350/175SL, 198, 239, 241, 175 E

[56] References Cited
UNITED STATES PATENTS
2,410,722  11/1946  Eckert ........................ 350/239

OTHER REFERENCES
Scientific American, "The Amateur Scientist," Vol. 189, #6, Dec. 1953 (350/175 SL) Pages 110–113.

Primary Examiner—David Schonberg
Assistant Examiner—Paul A. Sacher

ABSTRACT: A panoramic viewer having a large slot in the front portion thereof and a special wide-angle ocular in the rear portion thereof for eliminating the distortion of a fisheye-type picture placed in the slot to enable substantially distortion-free wide-angle viewing.

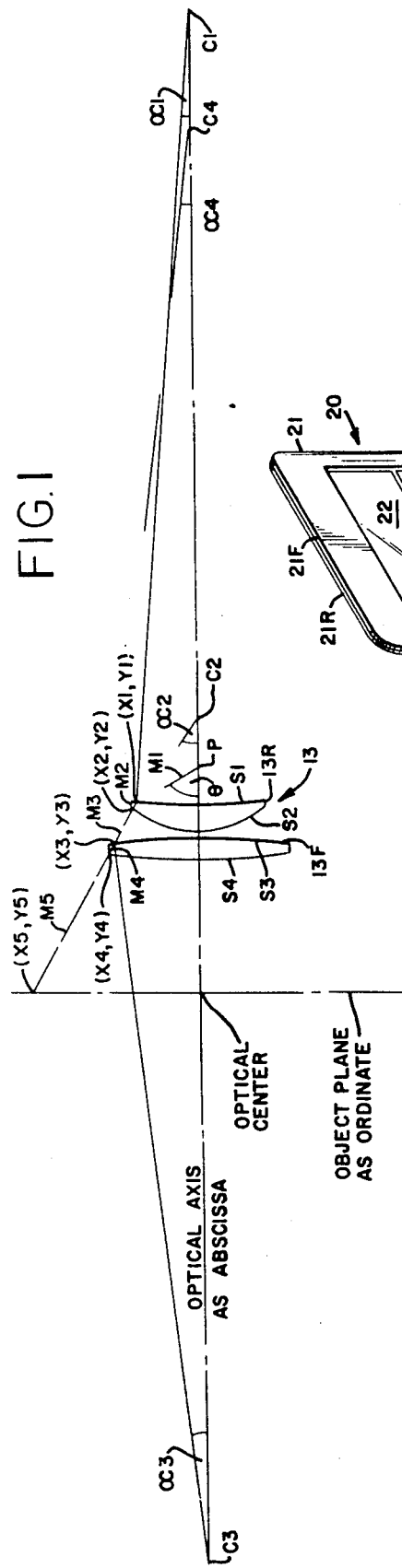
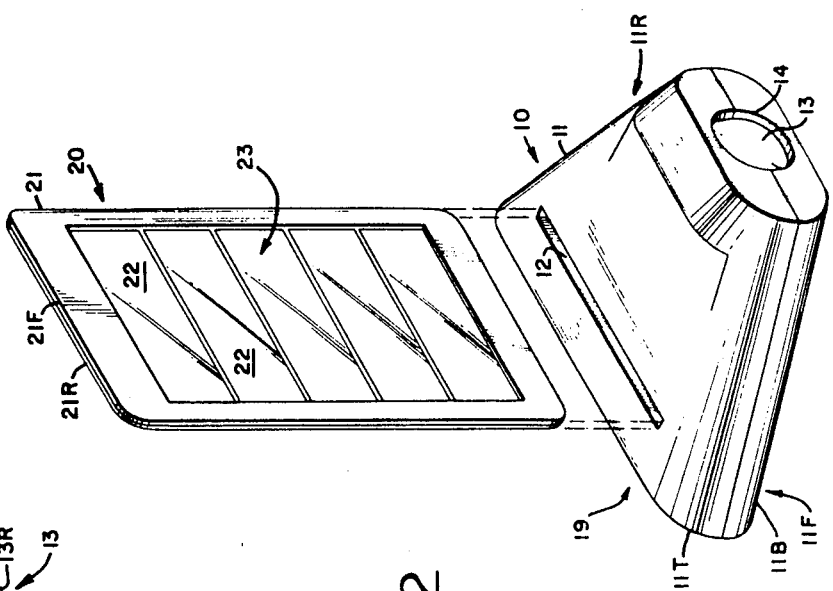
INVENTOR.
HARVEY L. RATLIFF, JR.

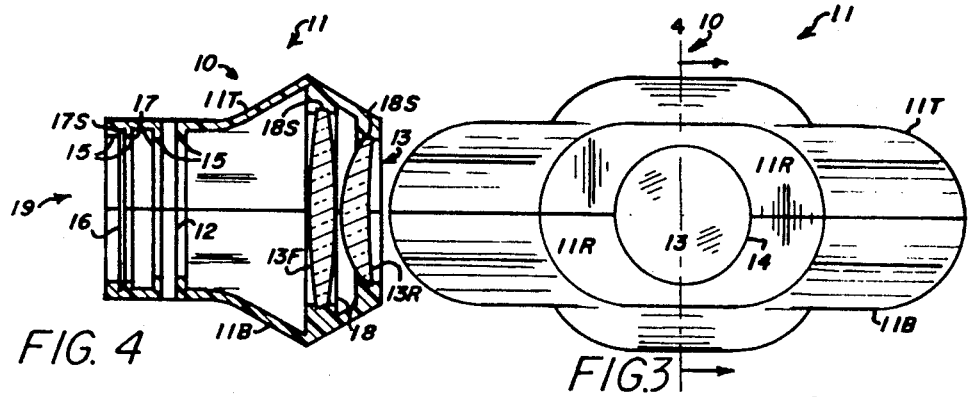
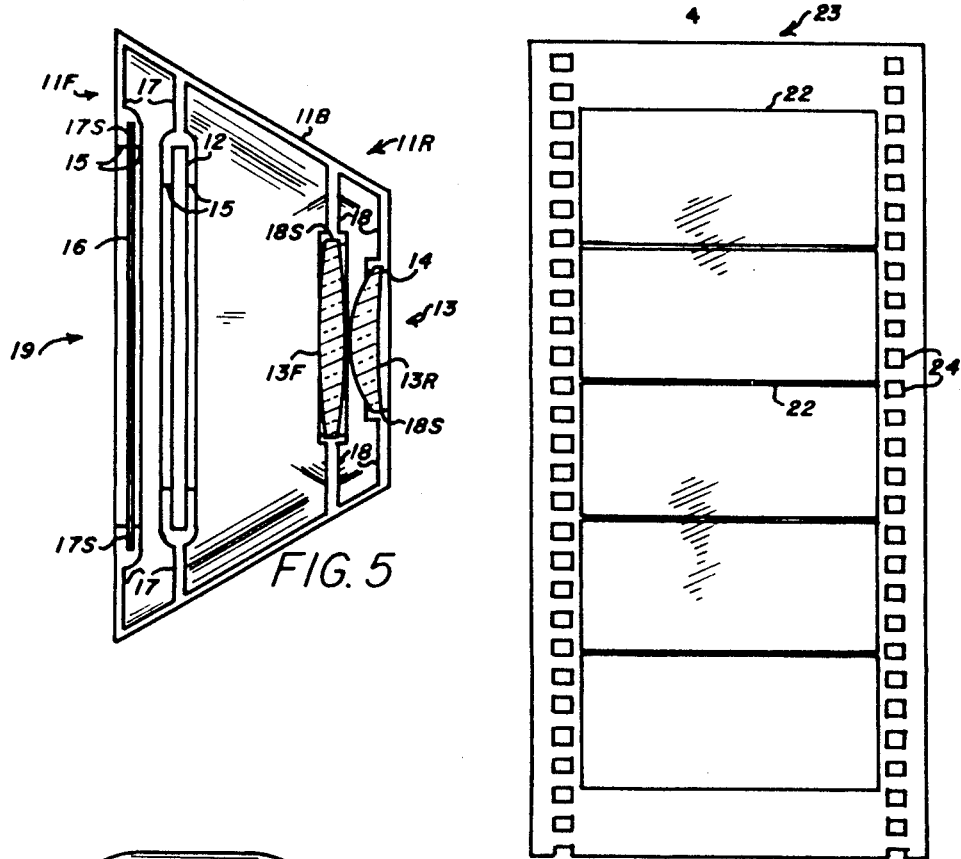
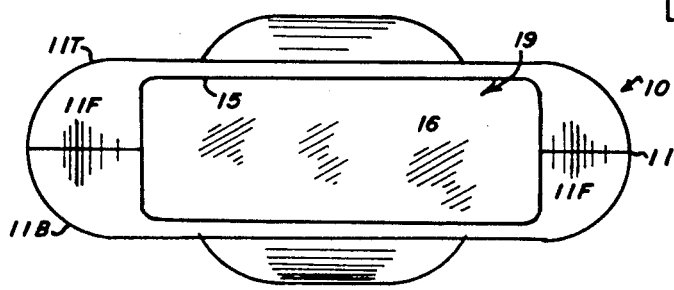

DISTORTION-FREE PANORAMIC VIEWER AND PICTURE THEREFOR

This application is a continuation-in-part of my copending prior applications Ser. No. 440,110, filed 3/16/65, and now U.S. Pat. No. 3,504,122 Ser. No. 618,977, filed 2/27/67, and now U.S. Pat. No. 3,471,224 which is a continuation-in-part of Ser. No. 343,841, filed 2/10/64 and now U.S. Pat. No. 3,464,570, Ser. No. 638,319, filed 5/15/67, and Ser. No. 662,716, filed 8/23/67 and now abandoned.

BACKGROUND OF THE INVENTION

Workers in the art have been trying to devise better wide-angle viewing systems for over a half century. Back in 1923 L. E. W. Van Albada wrote a paper about some of the work that had been done. He discussed his efforts and the efforts of others to use a pincushion distortion-introducing ocular in a viewing system. He showed that this type ocular could be used in a distortion-free wide-angle system by using the same lens in taking the picture in a way such that the path of the light rays was exactly reversed. He concluded, however, that this type ocular was virtually useless and did not solve the problems necessary o make it useful, making the heretofore accepted conclusions that, among other things, the astigmatic aberration of the image prohibited utility unless one "lives with" defects and that the desirable system is one in which both the image and the ocular have "uniform lateral magnification," and he proceeded to teach the construction of an ocular having "uniform lateral magnification" which incidentally was too expensive for a given focal length. Coincidentally, Robin Hill introduced the "fisheye" lens and its astigmatic-free "fisheye" image back in 1923 also, which was considered to have very limited utility, viz where the bad distortion could be "lived with" or the image could be projected back through the "fisheye" lens upon a spherical screen portion.

The general tenure of the prior art is that "uniform lateral magnification" in both the images and the oculars is the "gem" which should be sought by workers in the art. Most workers constrain themselves to narrow-angle systems and are therefore able to assume "uniform lateral magnification." Some as Van Albada have gone to a lot of trouble to construct a wide-angle ocular which has "uniform lateral magnification," while others have simply "lived with" bad distortion or bad astigmatism in the wide-angle image as viewed.

Applicant is using a new approach which defines and appreciates properties of oculars which were heretofore assumed directly or implicitly as defects and using these heretofore unappreciated properties as the very crux of a new mode of operation, utility and function capable of results which were heretofore not possible for the "ordinarily skilled." The heretofore sought oculars having "uniform lateral magnification" have proved too expensive to make and require too expensive pictures in wide-angle systems.

It is the primary object of this invention to provide a better wide-angle viewing device which is capable of distortion-free and astigmatic-free presentations at wide angles.

Another object is to provide these benefits for a low price to the consumer.

Still a further object is to provide a viewing device which requires very little skill, effort, or care on the part of the user.

SUMMARY OF THE INVENTION

With the foregoing background, objects and others in view which will be clarified hereinafter, the device of this invention contemplates a viewer housing supporting a special ocular in its rear portion and a picture slot in its front portion with a means in the housing for making visible the wide-angle portions of a picture which may be placed into the slot as well as merely the narrow-angle portions. The ocular has a predetermined property K which is substantially constant and which defines its pincushion distortion introducing character whereby a fisheye image having the reverse K is easily attainable and when this reverse K fisheye image is placed in the slot within its frame of visibility, the most obvious location, a wide-angle, distortion-free, and astigmatic-free presentation is achieved. At the same time the picture size for any given angle of view is much less and the ocular construction for any given focal length is much simpler than in the case of "uniform lateral magnification." And very little skill, effort or care on the part of the user is required.

DESCRIPTION OF THE DRAWINGS

FIG. 1 is a diagrammatic drawing to illustrate one form of the special ocular of the invention.

FIG. 2 is a perspective view of a contemplated form of the viewer and picture showing how the picture is inserted.

FIG. 3 is a rear view of the viewer of FIG. 2.

FIG. 4 is a sectional view of the viewer of FIG. 3 taken along line 4—4 looking in the direction of the arrows.

FIG. 5 is a top view of the bottom half 11B of the viewer of FIGS. 2–4 with the lenses 13R and 13F in section.

FIG. 6 is a diagrammatic drawing showing a contemplated frame of the pictures before they are sandwiched within the supports 21 as shown in FIG. 2.

FIG. 7 is a front view of the viewer of FIGS. 2–5.

DETAILED DESCRIPTION

To provide a conventional proof of applicant's heretofore unappreciated property K of his oculars applicant has related $\theta$ to $Y5$ for his exemplifying ocular with reference to FIG. 1 as follows:

By assuming the object plane of the exemplifying ocular as the ordinate and the optical axis of the exemplifying ocular as the abscissa applicant has written the following equations:

1. The equation of the exemplified first optical surface S1 is written from analytical geometry as:
$$(X-7.377)^2+Y^2=36,000,000, \qquad \text{eq. 1}$$
since its radius of curvature is 6 inches and its center of curvature is 7.377 inch behind the object plane and on the optical axis.

2. The equation of the exemplified second optical surface S2 is written from analytical geometry as:
$$(X-1.982)^2+Y^2=(0.807)^2 \qquad \text{eq. 2}$$
since its radius of curvature is 0.807 inch and its center of curvature C2 is 1.982 inch behind the object plane and on the optical axis.

3. The equation of the exemplified third optical surface S3 is written from analytical geometry as:
$$(X+4.267)^2+Y^2=(5.401)^2 \qquad \text{eq. 3}$$
since its radius of curvature is 5.401 inch and its center of curvature C3 is 4.267 inch in front of the object plane and on the optical axis.

4. The equation of the exemplified fourth optical surface S4 is written from analytical geometry as:
$$(X-6.391)^2+Y^2=(5.401)^2 \qquad \text{eq. 4}$$
since its radius of curvature is 5.401 inch and its center of curvature C4 is 6.391 inch behind the object plane and on the optical axis.

5. The equation of the exemplified object plane is written from analytical geometry as:
$$X=0 \qquad \text{eq. 5}$$
since it is assumed as the ordinate.

6. The equation of a ray entering the eye exemplified at P is written from analytical geometry as:
$$Y=-\tan\theta(1.647-X) \qquad \text{eq. 6}$$
since $\theta$ is the angle the ray makes with the optical axis and therefore $\tan\theta$ is the slope thereof and further the pupil P of the eye is assumed as 1.647 inch from the exemplified object plane on the optical axis (since all the rays from any point on the object plane leave the ocular—its first optical surface S1—substantially parallel, it is immaterial where the pupil actually is within wide limits).

By defining that the slope of this ray is $M1$ ($M1=\tan\theta$) then the equation is written as:
$$Y=-M1(1.647-X) \qquad \text{eq. 6'}$$

The coordinates $(X1, Y1)$ of the point at which said ray leaves the first optical surface S1 are determined by applicant by substituting equation 1 into equation 6 for any assumed value of $\theta$. For example, if $\theta$ is assumed as 15°, then $X1=1.377$ inch and $Y1=0.072$ inch.

7. When the coordinates $(X1, Y1)$ are known, the equation of said ray as it passes to the first optical surface S1 from the second optical surface S2 is written from analytical geometry as:

$$Y-Y1=-M2(X-X1) \quad \text{eq. 7}$$

For example, if $\theta$ is assumed as 15°, then as:

$$Y-0.072=-M2(X-1.377)$$

8. The Slope $M2$ is computed by:
first, from trig. determining $\alpha 1$, whence:

$$\alpha 1=\sin^{-1}(Y1/6.000), \quad \text{eq. } 8a$$

For example, $\alpha 1=0.069°$ when $\theta=15°$,
second, from trig. determining $\theta_1$, whence:

$$\theta_1=\theta-\alpha 1, \quad \text{eq. } 8b$$

For example, $\theta_1=14.931°$ when $\theta=15°$,
third, from snell's law determining $\theta_1'$, whence:

$$\theta_1'=\sin^{-1}(\sin\theta_1/1.491), \quad \text{eq. } 8c$$

where the index of refraction of the exemplified ocular material is assumed as molded acrylic plastic, i.e. 1.491 and the index of refraction of the surrounding media, viz air, is assumed as 1.000;
For example $\theta_1'=9.592$ when $\theta=15°$,
Therefore:

$$M2=\tan(\theta_1'+\alpha 1) \quad \text{eq. 8}$$

For example, $M2=0.177$ when $\theta=15°$.

The coordinates $(X2, Y2)$ of the point at which said ray leaves the second optical surface S2 are determined by applicant by substituting equation 2 and 8 into equation 7 for the assumed value of $\theta$. For example if $\theta$ is assumed as 15°, then $X2\cong 1.182''$ and $Y2\cong 0.106''$.

9. When the coordinates $(X2, Y2)$ are known the equation of said ray as it passes from the third optical surface S3 to the second optical surface S2 is written by applicant from analytical geometry as:

$$Y-Y2=-M3(X-X2) \quad \text{eq. 9}$$

For example, if $\theta=15°$, then as:

$$Y-0.106=-M3(X-1.182)$$

10. The slope $M3$ is computed by:
first, from trig. determining $\alpha 2$, whence:

$$\alpha 2=\sin^{-1}(Y2/0.807), \quad \text{eq. } 10a$$

For example, $\alpha 2=7.55°$ when $\theta=15°$,
second, from trig. determining $\theta 2$, whence:

$$\theta_2=\theta_1'+\alpha 1-\alpha 2 \quad \text{eq. } 10b$$

For example, $\theta_2=2.471°$ when $\theta=15°$, and
third, from snell's law determining $\theta_2'$, whence:

$$\theta_2'=\sin^{-1}(1.491\sin\theta_2), \quad \text{eq. } 10c$$

where the index of refraction of the ocular lens material (viz acrylic plastic) is exemplified as 1.491 and the index of refraction of the surrounding media (viz air) is exemplified as 1.000,
For example, $\theta_2'=3.685°$ when $\theta=15°$,
Therefore:

$$M3=\tan(\alpha 2+\theta_2') \quad \text{eq. 10}$$

For example, $M3=0.198$ when $\theta=15°$

The coordinates $(X3, Y3)$ of the point at which said ray leaves the third optical surface S3 are determined by applicant by substituting equations 3 and 10 into equation 9 for the assumed value of $\theta$. For example if $\theta$ is assumed as 15°, then $X3\cong 1.133$ inch and $Y3\cong 0.116$ inch.

11. When the coordinates $(X3, Y3)$ are known the equation of said ray as it passes from the fourth optical surface S4 to the third optical surface S3 is written by applicant from analytical geometry as:

$$Y-Y3=-M4(X-X3) \quad \text{eq. 11}$$

For example, if $\theta=15°$, then as:

$$Y-0.116=-M4(X-1.133)$$

12. The slope $M4$ is computed by:
first, from trig. determining $\alpha 3$, whence:

$$\alpha 3=\sin^{-1}(Y3/5.401), \quad \text{eq. } 12a$$

For example $\alpha 3=1.229°$ when $\theta=15°$,
second, from trig. determining $\theta_3$, whence:

$$\theta_3=\alpha 2+\theta_2'+\alpha 3 \quad \text{eq. } 12b$$

For example $\theta_3=12.46°$ when $\theta=15°$
third, from snell's law determining $\theta_3'$, whence:

$$\theta_3'=\sin^{-1}(\sin\theta_3/1.491) \quad \text{eq. } 12c$$

For example, $\theta_3'=7.10°$ when $\theta=15°$,
Therefore:

$$M4=\tan(\theta_3'-\alpha 3) \quad \text{eq. 12}$$

The coordinates $(X4, Y4)$ of the point at which said ray leaves the fourth optical surface S4 are determined by applicant by substituting equation 4 and 12 into equation 11 for the assumed value of $\theta$. For example, if $\theta=15°$, then $X4\cong 0.992$ inch and $Y4\cong 0.134$ inch.

13. When the coordinates $(X4, Y4)$ are known the equation of said ray as it passes from the object plane to the fourth optical surface S4 is written by applicant from analytical geometry as:

$$Y-Y4=-M5(X-X4) \quad \text{eq. 13}$$

For example, if $\theta=15°$, then as:

$$Y-0.134=-M5(X-0.992)$$

14. The slope $M5$ is computed by:
first, from trig. determining $\alpha 4$, whence:

$$\alpha 4=\sin^{-1}(Y4/5.401) \quad \text{eq. } 14a$$

For example, if $\theta=15°$, $\alpha 4=1.422°$
second, from trig. determining $\theta_4$, whence:

$$\theta_4=\theta_3'-\alpha 3-\alpha 4 \quad \text{eq. } 14b$$

For example, if $\theta=15°$, $\theta_4=5.68°$
third, from snell's law determining $\theta_4'$, whence:

$$\theta_4'=\sin^{-1}(1.491\sin\theta_4) \quad \text{eq. } 14c$$

Therefore:

$$M5=\tan(\theta_4'+\alpha 4) \quad \text{eq. 14}$$

For example if $\theta=15°$, $M5=0.175$

The coordinates $(X5, Y5)$ of the point of origin of said ray are then determined by applicant by substituting equations 5 and 14 in equation 13 for the assumed value of $\theta$. For example, if $\theta=15°$, then $X5=0$ and $Y5\cong 0.307$ inch.

By the above type of reasoning applicant related $Y5$ to $\theta$ for various values of $\theta$ and found, for example, that @ $\theta=15°$, $\theta/Y5\cong 48.8°/\text{inch}$ @ $\theta=30°$, $\theta/Y5\cong 48.3°/\text{inch}$, @ $\theta=45°$, $\theta/Y5\cong 47.6°/\text{inch}$, and @ $\theta=60°$, $\theta/Y5\cong 47.5°/\text{inch}$. And further, applicant found that a simple relation could be set up with small error, whence:

$$K\cong\theta/Y \quad \text{eq. 15}$$

and for the exemplified ocular $K\cong 48°/\text{inch}$,
where $Y$ replaces $Y5$ in the above derivation, $\theta$ is the same as defined in the above derivation, and $K$ is an inherent property of the ocular newly appreciated by applicant and defined in terms of angular units at the pupil P of the eye per linear unit at the object plane and which is not present (or 0°/inch) in oculars having "uniform lateral magnification" and heretofore to be avoided as a defect, being totally unappreciated and undefined. It could heretofore play no useful part in achieving a beneficial result even if it was accidentally present, undesirably, in a viewer and at wide angles could heretofore be only the cause of bad defects and was implicitly to be avoided at great costs. Stated differently, it could heretofore be only worse than a merely aggregative addition to a wide-angle viewer, being only a detrimental addition if, by accident, it were heretofore undesirably present. Applicant is the first to invent (not merely aggregate undesirably by accident if at all) a true combination (not an undesired and worse then worthless true aggregation) which usefully employs this property $K$ for the first time as the very crux of the combination for achieving a truly beneficial result (not merely as an unemployed worse than useless detriment to reduce the quality of the viewed image) of a truly astigmatic-free and distortion-free viewed image at wide angles of view.

It may be noted that $K$ is inversely related to the object plane distance $o$ from the center of ocular 13 to the object plane as measured along the optical axis, i.e. $o\cong 1.183$ inch, and that if $o$ is divided into $R$ the number of degrees in a radian, i.e. $R\cong 57.3°/\text{radian}$, the result is approximately equal to $K$ at the center, or:

$$K\cong R/o. \quad \text{eq. 16}$$

From this it may be reasoned that if lens element 13R alone is used with an object plane distance $o$ of 1.59 inch, it would have a $K$ value of approximately 36°/inch, this object plane distance $O$ being chosen since it enables the eye to accommodate the image over the widest angles. By the reasoning clear form equations 1–14 supra $K$ could be found to actually approximately equal 36°/inch with the $o$ of 1.59 inch. So actually applicant's type oculars act as if they project their virtual image upon a spherical screen whose center is at $P$.

There are many other oculars which applicant has found to have this $K$ relation of equation 15, viz those of said copending applications Ser. No. 618,977, Ser. No. 662,716, and Ser No. 721,841, and U.S. Pat. No. 3,424,511.

The oculars of the embodiment hereinabove exemplified to have a $K \cong 48°$/inch (at the above exemplified object plane distance at which the eye can accommodate the image thereof throughout wide angles) are designed to work in conjunction with fisheye-type images (made as described in my copending prior applications Ser. No. 618,977, filed 12/27/67, 656,968, filed 5/5/67, 782,612, filed 12/10/68, or 638,319, filed 5/15/67) at their object planes which have the same value of a reverse or negative $K$ (i.e. if $K$ is considered a pincushion distortion or expansion constant then $-K$ could be considered a barrel distortion or compression constant, noting that "uniform lateral magnification" is constant with respect to $\tan \theta$ rather than $\theta$ and does not have the $K$) of: $-K \cong -48°$/inch whereby the $K$ of the viewed image is (48°−48°) 0°/inch or distortion-free. Actually if the $-K$ was say − 38°/inch, the distortion of the viewed image would be only as if the ocular had a $K$ value of 10°/inch (implying an $o$ of 5.73 inch with a focal length complying therewith to enable accommodation of the image) and the image at the object plane had "uniform lateral magnification," and this small amount of distortion is not very noticeable. Or if the $-K$ was say −58°/inch, the distortion of the viewed image would be only as if the image had a $-K$ value of −10°/inch (implying an $o$ of 5.73 inch with a focal length complying therewith to enable accommodation of the image) and the ocular 5.73 inch behind its object plane had "uniform lateral magnification," and this small amount of distortion is also not very noticeable.

With these $K$ values of substantially +48°/inch and −48°/inch high quality images having 100° horizontally, 43° vertically, and 108° diagonally can be compressed upon the 2.072"×0.906" frames of 70 mm. motion-picture film 23 of FIGS. 2 and 6 and mass produced by way of the "technicolor process" which in high volume is quite inexpensive per picture or per set of pictures 22 and the ocular 13 introduces the reverse $K$ to uncompress the image as viewed to present a distortion-free and astigmatic-free wide-angle image having angles of view of 100° horizontally and 43° vertically as viewed.

Object plane as herein used implies a plane for the real image consistent in distance from the ocular with the focal length of the ocular whereby the eye can accommodate the virtual image at wide angles.

Because of applicant's above-described operative principles, the "ordinarily skilled" can now be enabled to valuably use inexpensive oculars which were heretofore useless for wide-angle, distortion-free and astigmatic-free viewers. The "ordinarily skilled" now have available much less expensive viewers and pictures which give high quality results of enabling a wide angle which is distortion-free and astigmatic-free.

Since "uniform lateral magnification" implies:
$$\tan \theta \cong Y/o \quad \text{eq. 17}$$
where $\theta$, $Y$, and $o$ are as defined hereinabove or $o$ can be considered the effective object plane distance, it should be noted that if an ocular with the heretofore necessary "uniform lateral magnification" were still required and had a focal length enabling accommodation when the object plane is the same distance as in FIG. 1, i.e. $O$=1.183 inch, a horizontal $Y$ of 1.410 inches would be required for a horizontal $\theta$ of 50° and a format of 2.820"×0.934" would be required to achieve the same angle of view of 100°×43°. This format of 2.820"× 0.934" would eliminate the use of the 70 mm. "technicolor" film whereby the film cost would increase several times per picture. Additionally, an ocular having the heretofore necessary "uniform lateral magnification" of this focal length enabling $o$=1.183 inches would be much more difficult and/or expensive to make. Further, it will be noted that with the format of 2.820 inch, applicant's ocular with a $K$ of 48°/inch would produce 135° angle of view therefrom.

The principle reason applicant exemplifies the two lens ocular is that this is one way to obtain accommodation for the focusing power of the eye and a distortion-free 100° angle of view on the 2.072"×0.906" format, which is much more inexpensive for a given quality of image, without again disclosing the aspheric lenses which are also within the spirit and scope of the invention and are being protected per se, viz in said Ser. No. 662,716. Two lens oculars are certainly not essential to the invention as the "$K$" property and accommodation has been achieved by applicant with only one lens in the ocular, see said Ser. No. 662,716, Ser. No. 721,841, and Ser. No. 618,977, and U.S. Pat. No. 3,424,511 and other disclosures by applicant.

The preferred embodiment of the viewer 10 contemplated by applicant will now be exemplified in detail.

It is contemplated that the viewer 10, see FIG. 2, will be used with a picture assembly 20. The essential part of the picture the picture assembly 20 is that each image recorded in each of frames 22 has the reverse or $-K$ value produced by a "fisheye" lens and described hereinabove which is such as to substantially nullify the $+K$ of the ocular 13. It is contemplated that there is a cardboard support 21 which is comprised of a front cardboard element 21F which is adhered to the front of film 23 in a well-known manner such that its aperture is in registry with the outside borders of frames 22 and a rear cardboard element 21R which is likewise adhered to the rear of film 23 such that its aperture is in registry with the outside borders of frames 22 whereby there is nothing obstructing the view of frames 22.

It is contemplated that the viewer 10 comprises a housing 11, the special ocular 13 described in detail hereinabove and available for viewing by way of opening 14 in the rear portion 11R of 11, transverse slot means 12 provided within housing 11 in the front portion 11F thereof for transversely receiving and supporting a picture 20 upon the focal plane of ocular 13, and picture framing means 19 within said housing 11 for making visible the focal plane within said slot 12 over values of $\theta$ from 0° to wide-angle values of $\theta$ (viz from 0° values of $\theta$ to more than 42° values of $\theta$) as seen through ocular 13 whereby the observer would naturally register a picture frame 22 within framing means 19, with means 19 comprising illuminating means 16, viz a diffusing screen, and framing borders 15 which are molded as part of housing 11. Supporting ribs 17 are preferably supplied to provide additional support for slot 12 and framing borders 15 and illuminating means 16. Element 16 is supported within the housing by way of grooves 17S which preferably are a molded part of housing 11. It is contemplated that the housing 11 is made up of two identical halves 11T and 11B. Preferably the lens elements 13F and 13R are supported in grooves 18S which are a molded part of the housing. Preferably ribs 18 are provided to provide additional support for lens elements 13F and 13R.

It is contemplated that for assembly lenses 13R and 13F are placed in grooves 18S provided therefor in the bottom housing half 11B and illuminating means, viz diffusing screen, 16 is placed in grooves 17S of bottom half 11B. Then the bottom edges of top half 11T are coated with a well-known adhesive and slipped down to 11B with 13F and 13R in grooves 18S of top half 11T and with 16 in grooves 17S of top half 11T until the two halves meet and adhere to form assembly 10.

It is preferred that the picture frames 22 be mass produced upon the well-known 70 mm. motion-picture film 23 shown in FIG. 6 whereby high quality wide-angle pictures can be mass produced at low unit cost.

As herein used "focal plane" implies the same meaning set forth supra for "object plane" but is not necessarily flat and could be cylindrical as in said U.S. Pat. No. 3,424,511.

People of "ordinary skill" can obviously use other modes of practicing the above-described invention such as they could attach the two halves 11T and 11B as described in said U.S. Pat. No. 3,424,511, use a spring means in slot 12 as described in said U.S. Pat. No. 3,424,511, make the slot 12 cylindrical as in said U.S. Pat. No. 3,424,511 when considered with respect to only one of the two oculars in said U.S. Pat. No. 3,424,511, use the ocular described in said Ser. No. 662,716 or said U.S. Pat. No. 3,424,511, and make other modifications obviously without departing from the spirit and scope of the invention as claimed hereinafter. Also, of course, the present invention easily offers the potential of substantially distortion-free angles of view up to some 180°×150° if a more expensive format is designed for, viz see 440,110, or 618,977, cited supra.

I claim:

1. A wide-angle viewing device for recreating substantially distortion-free panoramic views, comprising: a housing; a single wide-angle ocular supported by said housing in the rear portion thereof in a position to be looked through by the eye of an observer and having optical surfaces which produce substantially the following predetermined relation over wide-angles of view:

$$K \cong \theta/Y$$

where: $\theta$ is the angle a ray entering the eye of an observer makes with the optical axis of the ocular, $Y$ is the distance from the optical center of the focal plane of said ocular to the point of origin of said ray measured along a line perpendicular to said optical axis and passing through said optical center, and $K$ is a predetermined property of the ocular which has a predetermined value that is substantially constant throughout wide-angle values of $\theta$ for nullifying a predetermined amount of fisheye-type distortion in a fisheye-type picture optically aligned at the focal plane of said ocular; transverse slot means within said housing in the front portion thereof for transversely receiving and supporting a picture upon the focal plane of said ocular; and single picture-framing means within the housing surrounding said slot for making visible the focal plane within said slot over values of $\theta$ from 0° to wide-angle values of $\theta$ as seen through said ocular.

2. A picture assembly for use at the focal plane of a wide-angle ocular having a predetermined distortion property $+K$, where:

$$+K \cong \theta/Y$$

If $\theta$ is the angle a ray entering the eye of an observer looking into the ocular makes with the optical axis of the ocular, $Y$ is the distance from the optical center of the focal plane of said ocular to the point of origin of said ray measured along a line perpendicular to said optical axis and passing through said optical center, and $+K$ has a predetermined value that is substantially constant throughout wide-angle values of $\theta$, comprising:

a film frame; and image of an object recorded within said frame to have a predetermined reverse distortion property $-K$ which is of a predetermined value that will substantially nullify the $+K$ of the ocular when said image is within said focal plane with its optical center on said optical axis; and support means for enabling said frame to be held within said focal plane with the optical center of said image upon said optical axis.

3. A picture assembly for use at the focal plane of a wide-angle ocular having a predetermined distortion property $K \cong \theta/Y$ wherein $\theta$ is the angle a ray entering an observer's eye makes with the optical axis of said ocular, $Y$ is the distance from the optical center of the focal plane to the point of origin of the ray measured along a line passing through the optical center perpendicular to the optical axis, and $K$ is substantially constant for all values of $\theta$ from 0° to wide-angle values of $\theta$, said picture assembly comprising:

a compressed, fisheye-type picture of an object having a predetermined distortion property $-K$ which will substantially nullify the distortion $+K$ of the ocular when said picture is positioned at the focal plane of said ocular with the optical center of said picture on the optical axis of said ocular, and support means for mounting said picture for insertion in the focal plane of said ocular.

4. The assembly of claim 2 wherein said wide-angle values of $\theta$ means values of $\theta$ greater than 42°.

UNITED STATES PATENT OFFICE
CERTIFICATE OF CORRECTION

Patent No. 3,601,475　　　　　　　　　Dated　August 24, 1971

Inventor(s)　　Harvey L. Ratliff, Jr.

It is certified that error appears in the above-identified patent and that said Letters Patent are hereby corrected as shown below:

Column 2, line 21, "frame" should read --form--.

Column 2, line 29, "his exemplifying", second occurrance, should be deleted.

Column 3, line 35, "Y2 ≅ 0.106" 2"", should read --Y2 ≅ 0.106"--.

Column 3, line 43, "$\theta_2$"", should read --$\theta_2$--.

"　　", line 49, "$\theta_2$"", should read --$\theta_2$--.

"　　", line 51, "$\theta_2' = \sin^{11}(1.49 \sin \theta_2)$", should read --$\theta_2' = \sin^{-1}(1.49 \sin \theta_2)$--.

Column 3, line 45, "$\sin^{11}$", should read --$\sin^{-1}$--.

"　　" line 15, "　" "　" "　" "　".

"　　" line 21 "　" "　" "　" "　".

"　　" line 74, "$\theta - 15°$", should read --$\theta = 15°$--.

Column 4, lines 4, 23, and 29, "$\sin^{11}$", should read --$\sin^{-1}$--.

Column 4, line 71, "O", should read --o--.

Column 5, lines 4 and 73, "O", should read --o--.

Column 6, lines 27 and 28, "the picture the picture" should read --the picture--.

Column 8, line 14, "and image", should read --an image--.

UNITED STATES PATENT OFFICE
CERTIFICATE OF CORRECTION

Patent No. 3,601,475     Dated August 24, 1971

Inventor(s) Harvey L. Ratliff, Jr.     PAGE - 2

It is certified that error appears in the above-identified patent and that said Letters Patent are hereby corrected as shown below:

Column 8, lines 39 and 40, "The assembly of...greater than 42°", should read as follows:

--A panoramic viewing device for reconstructing a distortion-free, wide-angle panoramic view from a compressed, fisheye picture, said device comprising:

a housing having a slot therein for receiving a compressed, fisheye-type picture, an ocular carried by said housing for reconstructing a distortion-free, wide-angle, panoramic view from a compressed, fisheye-type picture inserted within the slot, means within said housing for holding a picture inserted into the slot at said ocular's focal plane, and for framing such a picture at the focal plane so that such a picture is visible through said ocular for values of $\theta$ from zero degrees to at least 42 degrees, $\theta$ being the angle a ray entering an observer's eye makes with said ocular's optical axis, said ocular having optical surfaces which produce substantially the following relationship for all values of $\theta$ from zero degrees to at least 42 degrees: $K \approx \theta/Y$ wherein Y is the distance from the focal plane's optical axis to the point of origin of the ray measured along a line perpendicular to said optical axis and passing through the optical center, and K is substantially constant for values of $\theta$ from zero degrees to at least 42 degrees--.

UNITED STATES PATENT OFFICE
CERTIFICATE OF CORRECTION

Patent No. 3,601,475          Dated August 24, 1971

Inventor(s)    Harvey L. Ratliff, Jr.              PAGE - 3

It is certified that error appears in the above-identified patent and that said Letters Patent are hereby corrected as shown below:

Signed and sealed this 8th day of August 1972.

(SEAL)
Attest:

EDWARD M. FLETCHER, JR.                ROBERT GOTTSCHALK
Attesting Officer                      Commissioner of Patents